US009021317B2

(12) United States Patent
Bennah et al.

(10) Patent No.: US 9,021,317 B2
(45) Date of Patent: Apr. 28, 2015

(54) REPORTING AND PROCESSING COMPUTER OPERATION FAILURE ALERTS

(75) Inventors: Albert D. Bennah, Durham, NC (US); Harold E. Vincent, Jr., Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 348 days.

(21) Appl. No.: 12/402,721

(22) Filed: Mar. 12, 2009

(65) Prior Publication Data
US 2010/0235688 A1 Sep. 16, 2010

(51) Int. Cl.
*G06F 11/00* (2006.01)
*G06F 11/07* (2006.01)

(52) U.S. Cl.
CPC ........ *G06F 11/0781* (2013.01); *G06F 11/0706* (2013.01)

(58) Field of Classification Search
CPC .......................... G06F 11/3006; G06F 11/3065
USPC ...................................................... 714/48, 57
See application file for complete search history.

(56) References Cited

U.S. PATENT DOCUMENTS

| | | | | |
|---|---|---|---|---|
| 5,367,670 A * | 11/1994 | Ward et al. | | 714/47 |
| 5,673,386 A * | 9/1997 | Batra | | 714/38 |
| 6,125,390 A | 9/2000 | Touboul | | |
| 6,170,067 B1 * | 1/2001 | Liu et al. | | 714/48 |
| 6,430,712 B2 * | 8/2002 | Lewis | | 714/47 |
| 6,684,265 B2 * | 1/2004 | Graf | | 710/18 |
| 7,028,338 B1 * | 4/2006 | Norris et al. | | 726/23 |
| 7,171,689 B2 * | 1/2007 | Beavers | | 726/22 |
| 7,191,228 B1 * | 3/2007 | Antony et al. | | 709/224 |
| 7,581,145 B2 * | 8/2009 | Nagamine | | 714/48 |
| 7,600,007 B1 * | 10/2009 | Lewis | | 709/223 |
| 7,818,631 B1 * | 10/2010 | Halikhedkar et al. | | 714/48 |
| 2003/0009711 A1 * | 1/2003 | Kuhn et al. | | 714/57 |
| 2003/0093516 A1 * | 5/2003 | Parsons et al. | | 709/224 |
| 2004/0221204 A1 * | 11/2004 | Johnson | | 714/47 |
| 2005/0216781 A1 * | 9/2005 | Doshi et al. | | 714/2 |
| 2006/0244585 A1 * | 11/2006 | Bishop et al. | | 340/506 |
| 2007/0223917 A1 * | 9/2007 | Nagamine | | 398/1 |
| 2007/0283194 A1 * | 12/2007 | Villella et al. | | 714/57 |
| 2010/0146326 A1 * | 6/2010 | Reilly | | 714/4 |

FOREIGN PATENT DOCUMENTS

| | | |
|---|---|---|
| EP | 0 751 651 A2 | 1/1997 |
| EP | 1 217 786 A2 | 6/2002 |
| JP | 2001/005692 | 1/2001 |

* cited by examiner

*Primary Examiner* — Joshua Lohn
(74) *Attorney, Agent, or Firm* — Edward J. Lenart; Katherine S. Brown; Kennedy Lenart Spraggins LLP

(57) ABSTRACT

Reporting and processing computer operation failure alerts, including deploying on a computer in a computing environment a plurality of alert reporting agents, the computing environment including a plurality of computers including a system management server that monitors the operating conditions of the other computers in the computing environment, the computer also including an alert generator configured to accept registrations of alert reporting agents, to generate alerts of present or pending failure, and to provide the generated alerts to registered alert reporting agents; registering the alert reporting agents with the alert generator; designating a primary alert reporting agent among registered alert reporting agents that communicate alerts to a same system management server; communicating a computer operation failure alert to all registered agents; and communicating, by the primary alert reporting agent only, the alert to the system management server.

17 Claims, 3 Drawing Sheets

REPORTING AND PROCESSING COMPUTER OPERATION FAILURE ALERTS

BACKGROUND OF THE INVENTION

1. Field of the Invention

The field of the invention is data processing, or, more specifically, methods, apparatus, and products for reporting and processing computer operation failure alerts.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of computer technology that has experienced advancement is the generation, reporting and processing of system alerts—becoming an important part of systems management solutions. Alert reporting agents, components of automated computing machinery, are instrumented to generate alerts so that end users are made aware of system malfunctions, even ones of a predictive nature. These alerts are usually surfaced through some entity such as systems management software or an intelligent hardware control point such as, for example, a Baseboard Management Controller or 'BMC.' These prior art agents are not aware of the existence of one another, even though they may report alerts to the same management system, and their alert reporting procedures are typically incompatible, resulting in many duplicate alerts being issued to the end user in varying alert notification formats. This can result in many service calls from customers seeking help with seemingly unrelated alert messages which, when traced, are triggered by the same event. This problem also complicates the systems management software stack because the software has to make sense of often redundant alerts that have different content and latency due to network constraints. In fact, for many varieties of system faults, the system management resources can find themselves faced with a veritable 'storm' of redundant error messages.

SUMMARY OF THE INVENTION

Methods, apparatus, and computer program products are disclosed for reporting and processing computer operation failure alerts including deploying on a computer in a computing environment a plurality of alert reporting agents, each alert reporting agent composed of a separate module of automated computing machinery configured to communicate an alert of present or pending failure, the computing environment including a plurality of computers including a system management server that monitors the operating conditions of the other computers in the computing environment, the computer also including an alert generator, the alert generator composed of a system-level module of automated computing machinery configured to accept registrations of alert reporting agents, to generate alerts of present or pending failure, and to provide the generated alerts to registered alert reporting agents; registering the alert reporting agents with the alert generator, including providing to the alert generator an identifier for each registered alert reporting agent and an identifier of a system management server to which each registered alert reporting agent communicates alerts; designating, by the alert generator, a primary alert reporting agent among registered alert reporting agents that communicate alerts to a same system management server; communicating by the alert generator a computer operation failure alert to all registered agents; and communicating, by the primary alert reporting agent only, the alert to the system management server.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
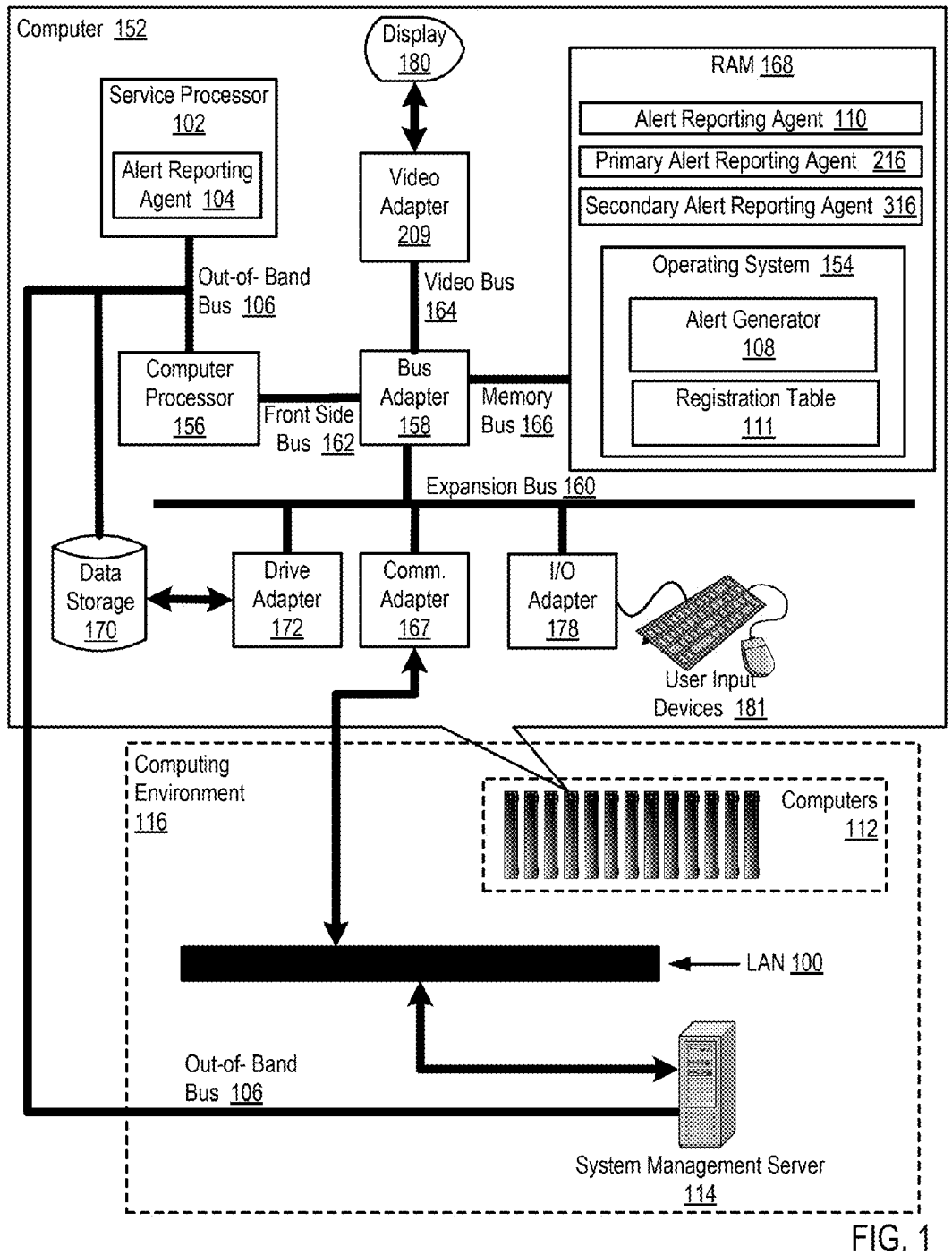
FIG. 1 sets forth a block diagram of automated computing machinery comprising an exemplary computer useful in reporting and processing computer operation failure alerts according to embodiments of the present invention.

Exemplary methods, apparatus, and products for reporting and processing computer operation failure alerts in accordance with the present invention are described with reference to the accompanying drawings, beginning with FIG. 1. Reporting and processing computer operation failure alerts in accordance with the present invention is generally implemented with computers, that is, with automated computing machinery. FIG. 1 sets forth a block diagram of automated computing machinery comprising an exemplary computer (152) useful in reporting and processing computer operation failure alerts according to embodiments of the present invention.

The computer (152) of FIG. 1 resides in a computing environment (116) that includes a plurality of computers (112) and a system management server (114) that monitors the operating conditions of the other computers in the computing environment. The computing environment (116) includes a number of computers (112, 152) and a system management server (114) that monitors the operating conditions of the other computers in the computing environment by communications through in band networks or buses (100) and out of band networks or buses (106).

In the example of FIG. 1, a plurality of alert reporting agents (104, 110, 216, 316) is deployed on the computer (152) in the computing environment (116). An alert reporting agent is a module of automated computing machinery, such as, for example, a Common Information Model ('CIM') provider, a device driver, or the like, that communicates an alert of present or pending failure to a system management server (114). Such an alert reporting agent (110) operates generally by receiving an alert of present or pending failure from an alert generator (108) and subsequently communicating such alerts to the system management server (114).

The computer (152) of FIG. 1 also includes at least one computer processor (156), sometimes referred to as a 'central processing unit' or 'CPU,' as well as random access memory (168) ('RAM') which is connected through a high speed memory bus (166) and bus adapter (158) to processor (156) and to other components of the computer (152). In addition to the alert reporting agent (110), also stored in RAM (168) is an alert generator (108), a module of automated computing machinery that accepts registrations of alert reporting agents, generates alerts of present or pending failure, and provides the generated alerts to registered alert reporting agents. The alert generator (108) of FIG. 1 operates generally by communicating alerts of present or pending failure received from system hardware and system software components to alert reporting agents (104, 110, 216, 316) that are registered with the alert generator (108). The alert generator in this example issues an alert of present or pending failure when a system software component or a system hardware component within a computer has malfunctioned. Such alerts can include, for example, a notification that a hardware component has failed, a notification that operating parameters for a hardware component are outside of acceptable operating ranges, a notification that system software error has occurred, and other malfunctions as will occur to those of skill in the art.

In the example of FIG. 1, the alert reporting agents (104, 110, 216, 316) are registered with the alert generator (108). The system management server may itself deploy the alert reporting agents in the computing environment and carry out the registration process for each deployed agent with the alert generator. Another way of registering the alert reporting agents is for the system management server to parameterize each alert reporting agent with contact information for the alert generator and allow each alert reporting agent to carry out its own registration with the alert generator. Registering the alert reporting agents (104, 110, 216, 316) with the alert generator includes providing to the alert generator (108) an identifier for each registered alert reporting agent. Registering the alert reporting agents (104, 110, 216, 316) with the alert generator (108) also includes providing to the alert generator (108) an identifier of a system management server (114) to which each registered alert reporting agent (104, 110, 216, 316) communicates alerts. Registering the alert reporting agents can be carried out, for example, by use of a registration table such as illustrated in Table 1:

TABLE 1

Registration Table

| Agent ID | Management Server ID | Agent Type |
| --- | --- | --- |
| Agent1 | Server1 | Primary |
| Agent2 | Server1 | Secondary |
| Agent3 | Server2 | Primary |
| Agent4 | Server3 | Primary |
| Agent5 | Server2 | Secondary |

Each record in table 1 represents a registration of an alert reporting agent with an alert generator. Each record in the table associates an agent identifier with an identifier of a system management server to which each registered alert reporting agent communicates alerts. In the example of Table 1, each record also associates an agent identifier with an agent type that can be used to identify primary and secondary alert reporting agents. Those of skill in the art will recognize that records in a registration table, in addition to the fields shown in Table 1, can also include any information useful in identifying alert reporting agents as may occur to those of skill in the art. In addition, the table structure is used in this example only for clarity of explanation, not as a limitation of the underlying invention. Readers will recognize that registrations of alert reporting agents may be implemented with a variety of data structures and storage arrangements as will occur to those of skill in the art, including, for example, linked lists, multi-dimensional arrays, C-style data structs, content addressable memory ('CAM'), and so on, and the use of all such data structures and storage arrangements for registration of alert reporting agents is well within the scope of the present invention.

In the example of FIG. 1, the alert generator (108) also designates a primary alert reporting agent (216) among registered alert reporting agents that communicate alerts to a same system management server (114). Designating a primary alert reporting agent can be carried out, for example, by identifying the primary alert reporting agent in an alert, or, for a further example, by identifying a primary alert reporting agent in agent registration data. In some embodiments, in addition to designating a primary alert reporting agent, the alert generator may also designate one or more secondary alerts reporting agents (316). In the example of FIG. 1, a primary alert reporting agent is the only alert reporting agent that communicates alerts to the system management server (114). Communicating such alerts to a system management server can be carried out, for example, by sending an alert to a system management server over a LAN.

In the example of FIG. 1, the alert generator (108) also communicates a computer operation failure alert to all registered agents. Communicating a computer operation failure alert to all registered agents can be carried out, for example, by sending an alert to a callback address associated with the registered alert reporting agent, by sending an alert to a service processor capable of communicating with the registered alert reporting agent, or in any manner as will occur to those of skill in the art. In the example of FIG. 1, the alert generator (108) communicates computer operation failure alerts to in-band alert reporting agents (110, 216, 316) by means of registered callback addresses, operating system calls, and the like. In this example, the out of band alert reporting agent (104) is implemented on the service processor (102) as a listener on the out of band bus (106) for communications from the alert generator. The alert generator (108) communicates computer operation failure alerts to the out of band alert reporting agent (104) by transmitting computer operation failure alert messages on the out of band bus.

In the example of FIG. 1, an alert reporting agent can be in-band alert reporting agent (110, 216, 316) or an out-of-band alert reporting agent (104). An in-band alert reporting agent (110, 216, 316) is adapted upon the processor (156) and the main memory of the computer (152) and in many embodiments is also adapted upon or within the operating system (154). In the example of FIG. 1, the in-band alert reporting agents (110, 216, 316) communicate with the alert generator (108) through operating system calls directly to and from the alert generator (108). An out-of-band alert reporting agent (104) is adapted upon the service processor (102) and the out-of-band alert reporting agent communicates with the alert generator via a system management network, also referred to as a 'out of band' bus (106), of the computer (152). In the computer (152) of FIG. 1, the service processor (102) is connected to the processor (156), to disk drive (170), and optionally to other system components, through an out-of-band bus (106). Such an out-of-band bus (106) may be implemented as a Low Pin Count ('LPC') bus, an Inter-Integrated Circuit ('I2C') bus, a System Management Bus ('SMBus'), a Serial Peripheral Interface ('SPI') Bus, and so on as will occur to those of skill in the art.

The computer of FIG. 1 includes a service processor (102) that may be implemented, for example, as a specialized microcontroller embedded on the motherboard of the computer. As mentioned, for monitoring purposes, the service processor (102) is connected to the processor (156), to disk drive (170), and optionally to other system components through out-of-band bus (106). Different types of sensors built into the computer report to the service processor on metrics such as temperature, cooling fan speeds, operating system status, and so on. The service processor (102) monitors the sensors and sends alerts to the alert generator (108) for distribution to alert reporting agents. The service processor (102) provides alerts to the alert generator (108) through the out of band network (106) when any of the monitored metrics exceed predefined limits, indicating a potential failure of the computer. In addition to monitoring system components and communicating alerts, the service processor also may accept instructions from the system management server (114), also communicated through out of band bus (106), to take corrective action such as resetting or power cycling the computer to get a stalled operating system executing properly.

An example of a service processor that may be adapted for reporting and processing computer operation failure alerts according to embodiments of the present invention is a baseboard management controller ('BMC') used in many blade servers. The BMC's basic functions are defined by the Intelligent Platform Management Interface ('IPMI') architecture. The BMC may manage an interface between system management software and platform hardware. Physical interfaces to a BMC may include SMBus busses, an RS-232 serial console, address and data lines, and an Intelligent Platform Management Bus ('IPMB') that enables the BMC to accept IPMI request messages from system management servers in the system.

Also stored in RAM (168) is an operating system (154). Operating systems useful reporting and processing computer operation failure alerts according to embodiments of the present invention include UNIX™, Linux™, Microsoft XP™, AIX™, IBM's i5/OS™, and others as will occur to those of skill in the art. The operating system (154), alert generator (108), alert reporting agent (110), and the registration table (111) in the example of FIG. 1 are shown in RAM (168), but many components of such automation typically are stored in non-volatile memory also, such as, for example, on a disk drive (170). In addition, automated computing machinery such as the alert generator (108), alert reporting agent (110), and the registration table (111) may be implemented in hardware such as for example networks of synchronous and asynchronous logic, field-programmable gate arrays ('FPGAs'), complex programmable logic devices ('CPLDs'), or application specific integrated circuits ('ASICs').

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for reporting and processing computer operation failure alerts according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for reporting and processing computer operation failure alerts according to embodiments of the present invention include modems for wired dial-up communications, Ethernet (IEEE 802.3) adapters for wired data communications network communications, and 802.11 adapters for wireless data communications network communications.

Figure 2:
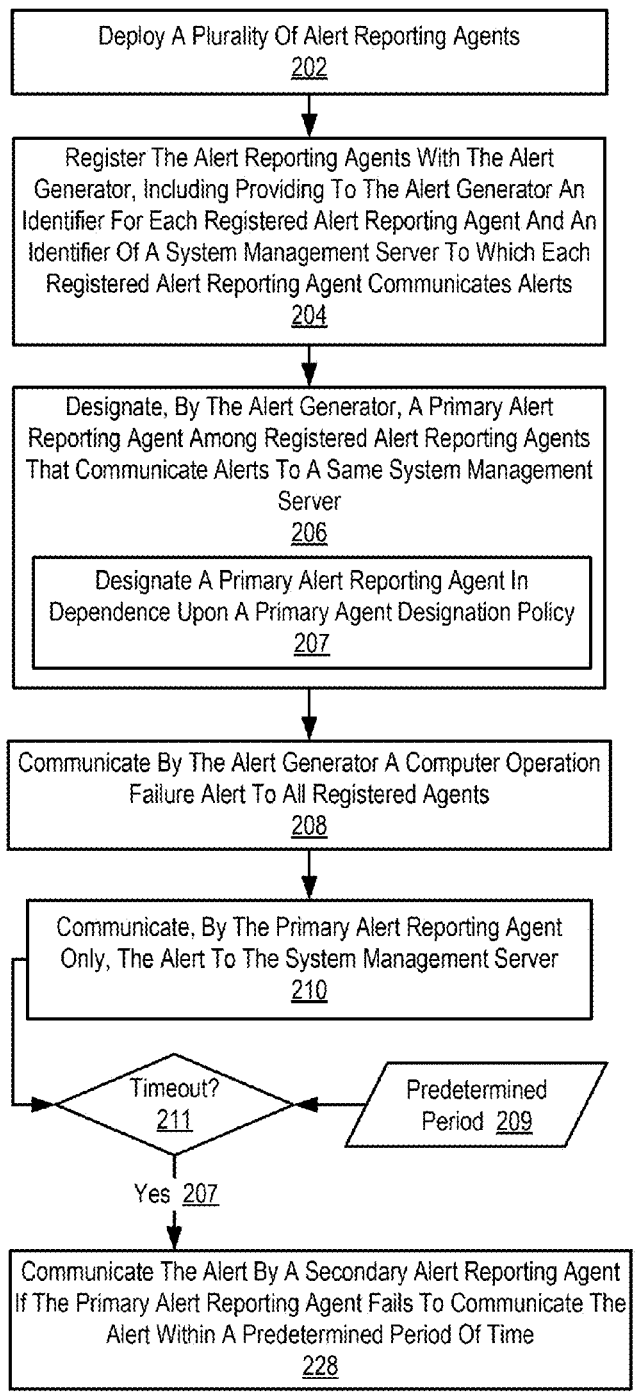
FIG. 2 sets forth a flow chart illustrating an exemplary method for reporting and processing computer operation failure alerts according to embodiments of the present invention.
Figure 2:
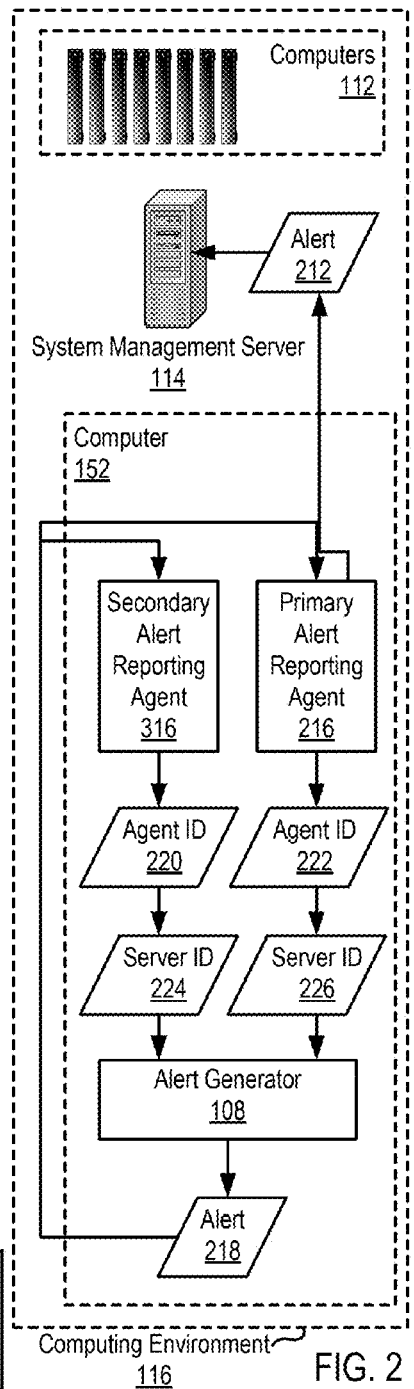

For further explanation, FIG. 2 sets forth a flow chart illustrating an exemplary method for reporting and processing computer operation failure alerts according to embodiments of the present invention. The method of FIG. 2 is implemented in a computing environment (116) similar to the one illustrated and explained above with reference to FIG. 1, including as it does a number of computers (112, 152) which in turn include a system management server (114) that monitors the operating conditions of the other computers in the computing environment by communications through in-band networks or buses (100 on FIG. 1) and out-of-band networks or buses (106 on FIG. 1). The method of FIG. 2 includes deploying (202) on a computer (152) in the computing environment (116) a plurality of alert reporting agents (216, 316). Deploying a plurality of alert reporting agents can be carried out, for example, by the system management server's (114) installing alert reporting agents on computers in the computing environment. An example of a system management server that can be adapted to report and process computer operation failure alerts according to embodiments of the present invention is IBM's Director™.

In the example of FIG. 2, each alert reporting agent (216, 316) is a separate module of automated computing machinery configured to communicate an alert of present or pending failure to a system management server (114). Alert reporting agents (216, 316) can be embodied, for example, as ASICs, FPGAs, CPLDs, computer program instructions operating on a CPU of the computer (152), computer program instructions operating on a service processor, or in any other manner as will occur to those of skill in the art. Such alert reporting agents (216, 316) can be configured to communicate an alert of present or pending failure to a system management server (114), for example, over a LAN (100 of FIG. 1). An alert of present or pending failure is issued when a system software component or a system hardware component within a computer has malfunctioned. Such alerts can include, for example, a notification that a hardware component has failed, a notification that operating parameters for hardware component are outside of acceptable operating ranges, a notification that system software error has occurred, or any other malfunction as will occur to those of skill in the art.

In the example of FIG. 2, the computing environment (116) includes a plurality of computers (112) and a system management server (114). A system management server (114) is a module of automated computing machinery that monitors the operating conditions of the other computers in the computing environment. Such a system management server is capable of performing preventive maintenance, diagnostic monitoring, updating firmware, and other functionality as will occur to those of skill in the art.

In the example of FIG. 2, the computer (152) includes an alert generator (108). The alert generator (108) is a system-level module of automated computing machinery configured to accept registrations of alert reporting agents (216, 316), to generate alerts of present or pending failure, and to provide the generated alerts to registered alert reporting agents. The alert generator (108) accepts registrations of alert reporting agents (216, 316) in the sense that an alert reporting agent, not the alert generator, initiates the registration process by requesting registration with the alert generator (108). The alert reporting agents can initiate the registration process by sending a request that includes the identity of the alert reporting agent and the identity of a system management server to which the alert reporting agent reports. An alternate way to effect registrations of alert reporting agents is for the system management server, upon deploying an agent, to send to the alert generator an instruction to register the agent, including sending to the alert generator the registration information for the alert reporting agent, agent identifier (220, 222), an identifier (224, 226) of the system management server to which the alert reporting agent reports alerts, and so on. Other ways to register an alert reporting agent with an alert generator may occur to those of skill in the art, and all such ways are well within the scope of the present invention.

The alert generator (108) of FIG. 2 also generates alerts of present or pending failure. In order to generate an alert of present or pending failure, an alert generator must first receive a system alert from system software or hardware. Upon receiving such a system alert, the alert generator creates a corresponding alert in a format that is discernable by an alert reporting agent. The alert generator (108) then provides the generated alerts to registered alert reporting agents. Providing the generated alerts to registered alert reporting agents can be carried out, for example, by sending an alert to a callback address associated with the registered alert reporting agent, by sending an alert to a service processor capable of communicating with the registered alert reporting agent, or in any manner as will occur to those of skill in the art. An alert generator can be embodied, for example, as computer program instructions operating on a CPU of the computer (152).

The example of FIG. 2 also includes registering (204) the alert reporting agents (216, 316) with the alert generator (108). Registering (204) the alert reporting agents (216, 316) with the alert generator (108) includes providing to the alert generator (108), by, for example, either the system management server itself or by one or more of the alert reporting agents acting on their own behalves in the registration process, an identifier (220, 222) for each registered alert reporting agent. Registering (204) the alert reporting agents (216, 316) with the alert generator (108) also includes providing to the alert generator (108) an identifier (224, 226) of a system management server (114) to which each registered alert reporting agent (216, 316) communicates alerts (212). Registering the alert reporting agents can be carried out, for example, by storing the identifier for each agent and the identifier of the system management server that the agent communicates alerts to in a table that is accessible by the alert generator.

The example of FIG. 2 also includes designating (206), by the alert generator (108), a primary alert reporting agent (216) among registered alert reporting agents (216, 316) that communicate alerts (212) to a same system management server (114). Designating a primary alert reporting agent can be carried out, for example, by identifying the primary alert reporting agent (216) in an alert itself, by identifying the primary alert reporting agent in alert reporting agent registration data, or in any other way as will occur to those of skill in the art. In some embodiments, in addition to designating a primary alert reporting agent, the alert generator may also designate one or more secondary alerts reporting agents (316). In the example of FIG. 2, a primary alert reporting agent (216) is the only alert reporting agent (216, 316) that communicates alerts (212) to the system management server (114).

In the example of FIG. 2, designating (206), by the alert generator, a primary alert reporting agent includes designating (207) a primary alert reporting agent in dependence upon a primary agent designation policy. A primary agent designation policy is a mechanism for determining which registered alert reporting agent will be designated as the primary alert reporting agent (216). Primary agent designation policies can be adaptive or preconfigured. An adaptive primary agent designation is a policy that identifies a primary alert reporting agent in dependence upon performance metrics. An example of such an adaptive primary agent designation policy includes, for example, a policy that tracks the rate at which each registered alert reporting agent successfully delivers an alert to a system management server and designates the alert reporting agent with the highest success rate as the primary alert reporting agent. A preconfigured primary agent designation policy is a static policy that identifies a primary alert reporting agent independent of performance metrics. Examples of such preconfigured primary agent designation policies include, for example, a policy that designates the first alert reporting agent to register with the alert generator as the primary alert reporting agent for a particular system management server, a policy that designates the last alert reporting agent to register with the alert generator as the primary alert reporting agent, and so on.

The example of FIG. 2 also includes communicating (208) by the alert generator (108) a computer operation failure alert (218) to all registered agents (216, 316). Communicating a computer operation failure alert (218) can be carried out, for example, by sending an alert to a callback address associated with the registered alert reporting agent, by sending an alert to a service processor capable of communicating with the registered alert reporting agent, or in any manner as will occur to those of skill in the art.

The example of FIG. 2 also includes communicating (208), by the primary alert reporting agent (216) only, the alert (212) to the system management server (114). Communicating the alert (212) to the system management server (114) can be carried out, for example, by sending the alert to the system management server over a LAN. Because an alert is sent to a system management server (114) by the primary alert reporting agent only, the present invention prevents a single system alert from being reported to the system management server multiple times by multiple alert reporting agents, thereby alleviating the system management server of the burden of dealing with duplicitous messages.

In the method of FIG. 2, communicating (210) the alert (212) to the system management server includes communicating (228) the alert by a secondary alert reporting agent if the primary alert reporting agent fails (211, 207) to communicate the alert within a predetermined period of time (209). The secondary alert reporting agent (316) communicates the alert upon the occurrence of a timeout (211) condition. A timeout condition may occur, for example, when the primary alert reporting agent (216) fails to confirm that an alert (212) was delivered to the system management server (114) within a predetermined period of time. The secondary alert reporting agent (316) can passively or actively learn of the occurrence of a timeout (211) condition. A secondary alert reporting agent (316) can passively learn of the occurrence of a timeout condition, for example, by receiving a message from the alert generator (108) indicating that a timeout condition has occurred. A secondary alert reporting agent (316) can actively learn of the occurrence of a timeout condition, for example, by tracking the current time and the time at which an alert (218) was received from the alert generator. If the secondary agent has not received confirmation that the alert was delivered to the system management server when the difference between the current time and the time that an alert was received from the alert generator exceeds a predetermined threshold, the secondary alert determines that a timeout condition has occurred. The secondary agent (316) can communicate an alert to the system management server, for example, by sending an alert (212) over a LAN (100 in FIG. 1).

Figure 3:
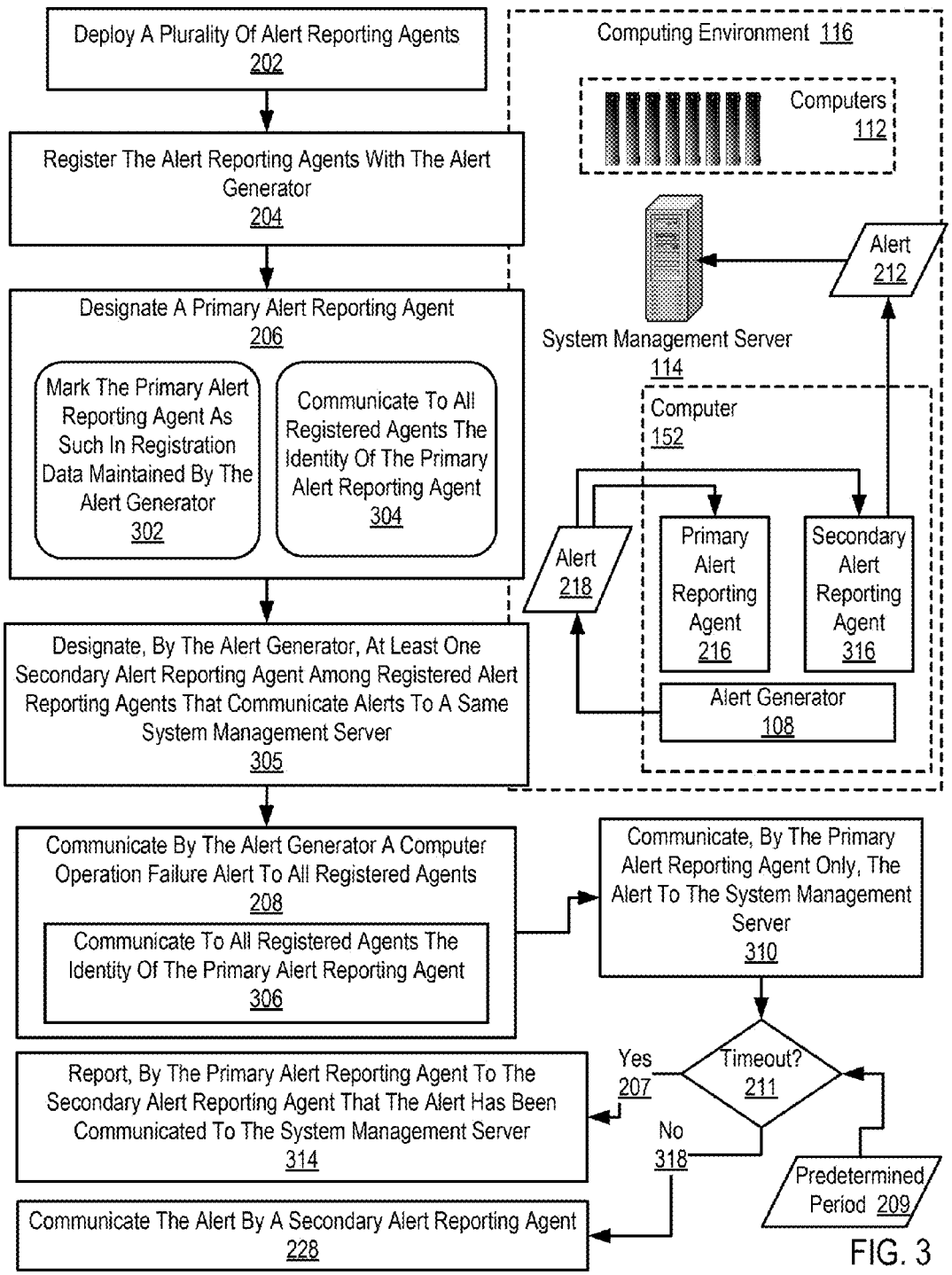
FIG. 3 sets forth a flow chart illustrating an exemplary method for reporting and processing computer operation failure alerts according to embodiments of the present invention.

For further explanation, FIG. 3 sets forth a flow chart illustrating a further exemplary method for reporting and processing computer operation failure alerts according to embodiments of the present invention. The method of FIG. 3 is implemented in a computing environment (116) similar to the one illustrated and explained above with reference to FIG. 1, including as it does a number of computers (112, 152) which in turn include a system management server (114) that monitors the operating conditions of the other computers in the computing environment by communications through in-band networks or buses (100 on FIG. 1) and out-of-band networks or buses (106 on FIG. 1). The method of FIG. 3 is similar to method of FIG. 2, including as it does deploying (202) a plurality of alert reporting agents, registering (204) the alert reporting agents with the alert generator, designating (206) a primary alert reporting agent, communicating (208) a computer operation failure alert to all registered agents, and communicating (210) the alert to the system management server.

In the method of FIG. 3, however, designating (206) a primary alert reporting agent can be carried out by marking (302) the primary alert reporting agent as such in registration data maintained by the alert generator. Registration data maintained by the alert generator, as illustrated for example by Table 1 above, may include data describing each registration of an alert reporting agent with the alert generator. Data describing each registration of an alert reporting agent with the alert generator can include, for example, an identifier for each registered agent, an identifier of a system management server to which each registered alert reporting agent communicates alerts, data indicating whether the agent is a primary alert reporting agent, a callback address for an alert reporting agent, and so on. An example of marking (302) the primary alert reporting agent as such in registration data maintained by the alert generator is the column labeled "Agent Type" in Table 1, where each record representing a registration of an alert reporting agent is marked with an indication whether the registered agent is a primary alert reporting agent.

In the method of FIG. 3, as an alternative to marking (302) the primary alert reporting agent in registration data maintained by the alert generator, designating (206) a primary alert reporting agent can also be carried out by communicating (304) to all registered agents the identity of the primary alert reporting agent. The identity of the primary alert reporting agent can be communicated to all registered agents, for example, by sending a message to a callback address associated with the registered alert reporting agent, by sending a message to a service processor capable of communicating with the registered alert reporting agent, or in any manner as will occur to those of skill in the art. Alternatively, the designation of a primary alert reporting agent may be included in alerts broadcast to all alert reporting agents, so that only one of the agents reporting to a particular system management server is so designated, all the other alert reporting agents consider themselves secondary, and only the primary reports the alert.

The method of FIG. 3 also includes designating (305), by the alert generator, at least one secondary alert reporting agent (316) among registered alert reporting agents that communicate alerts to a same system management server. Designating a secondary alert reporting agent may be implemented in registration information maintained by the alert generator, as illustrated by the "Agent Type" column in Table 1. Designating a secondary agent may be implemented by a particular message type communicated to all alert reporting agents for that purpose, in-band or out-of-band. And designating a secondary alert reporting agent can be carried out by identifying the secondary alert reporting agent in an alert itself—in which, for example, a designation of a primary agent is taken by all other agents as their designations as secondary. In the example of FIG. 3, a secondary alert reporting agent only communicates an alert to the system management server (114) in the event that the primary alert reporting agent does not deliver (211, 318) the alert to the system management server.

In the example of FIG. 3, communicating (208) by the alert generator a computer operation failure alert to all registered agents includes communicating (306)—as an optional example—to all registered agents the identity of the primary alert reporting agent. Communicating to all registered agents the identity of the primary alert reporting agent as part of communicating a computer operation failure alert to all registered agents can be carried out, for example, by including the identity of the primary alert reporting agent in the actual failure alert itself. In such an example, agents that receive a designation of some other agent as primary can take themselves as secondary.

In the method of FIG. 3, communicating (210) the alert (212) to the system management server (114) includes reporting (314), by the primary alert reporting agent (216) to the secondary alert reporting agent (316) that the alert has been communicated to the system management server (114). The primary alert reporting agent can determine that the alert (212) has been communicated to the system management server (114), for example, by waiting to receive an acknowledgement message from the system management server (114) or by assuming that the alert has been communicated to the system management server once the primary alert reporting agent sends an alert (212). Upon determining that the alert (212) has been communicated to the system management server (114), the primary alert reporting agent (216) reports to the secondary alert reporting agent (316) that the alert (212)

has been communicated to the system management server (114). The primary alert reporting agent (216) can report (314) that the alert has been communicated to the system management server (114) to the secondary alert reporting agent (316), for example, by sending a confirmation message directly to the secondary alert reporting agent (316) or, for a further example, by sending a confirmation message to the alert generator (108) that is subsequently relayed to the secondary alert reporting agent (316). Reporting (314) to the secondary alert reporting agent (316) that the alert has been communicated to the system management server (114) prevents the secondary alert reporting agent from taking further action in response to an alert (218) received from the alert generator.

In the method of FIG. 3, communicating (210) the alert (212) to the system management server includes communicating (228) the alert by a secondary alert reporting agent if the primary alert reporting agent fails to communicate the alert within a predetermined period of time (209). The secondary alert reporting agent (316) communicates the alert upon the occurrence of a timeout (207, 211) condition. A timeout condition may occur, for example, when the primary alert reporting agent (216) fails to confirm that an alert (212) was delivered to the system management server (114) within a predetermined period of time (209). The secondary alert reporting agent (316) can passively or actively learn of the occurrence of a timeout (211) condition. A secondary alert reporting agent (316) can passively learn of the occurrence of a timeout condition, for example, by receiving a message from the alert generator (108) indicating that a timeout condition has occurred. A secondary alert reporting agent (316) can actively learn of the occurrence of a timeout condition, for example, by tracking the current time and the time at which an alert (218) was received from the alert generator. If the secondary alert reporting agent has not received confirmation that the alert was delivered to the system management server when the difference between the current time and the time that an alert was received from the alert generator exceeds a predetermined threshold, the secondary alert determines that a timeout condition has occurred. If the secondary alert reporting agent confirms that the alert (212) was delivered to the system management server (114) within a predetermined period of time (209), meaning that a timeout condition has not occurred (211, 318), the secondary alert reporting agent will not communicate the alert to the system management server.

Many example embodiments of computing environments that report and process computer operation failure alerts according to embodiments of the present invention include both in-band and out-of-band alert reporting agents, although, such an architecture that includes the deployment of both kinds of agents remains optional within the scope of the present invention. Some embodiments may have only one kind of agent, others may have both, and all can have multiple agents of either or both kinds Consider an example environment in which a given system management server like IBM Director Server, for example, has deployed more than one remote in-band agent on a given monitored system in a datacenter and no out-of-band agents. One of those in-band agents may be instrumented to focus on Simple Network Management Protocol ('SNMP') alerts while another focuses on CIM-based alerts. When the underlying hardware reports that a particular alert event has occurred, say via a BMC, both in-band agents will be notified and will attempt to communicate the event back to the IBM Director. Within the scope of the present invention, both of these in-band agents will in effect cooperate, by coordination with their alert generator, so that only one will send the alert, mitigating duplicate alerts being issued. In another deployment scenario, a third agent, deployed out-of-band, joins the two in-band agents installed on the system. This third agent in this example is also associated with the IBM Director by the Alert Generator via the agent registration process. Any one of these agents can be designated as primary, and only the designated primary will report alerts to the IBM Director.

Exemplary embodiments of the present invention are described largely in the context of a fully functional computer system for reporting and processing computer operation failure alerts. Readers of skill in the art will recognize, however, that the present invention also may be embodied in a computer program product disposed upon computer-readable recording media for machine-readable information, including magnetic media, optical media, or other suitable recordable media. Examples of such recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reporting and processing computer operation failure alerts, the method comprising:
deploying on a computer in a computing environment a plurality of alert reporting agents, each alert reporting agent comprising a separate module of automated computing machinery configured to communicate an alert of present or pending failure, the computing environment comprising a plurality of computers including a system management server that monitors the operating conditions of the other computers in the computing environment, the computer further comprising an alert generator, the alert generator comprising an operating system-level module of automated computing machinery configured to accept registrations of alert reporting agents, to generate alerts of present or pending failure, and to provide the generated alerts to registered alert reporting agents;
registering the alert reporting agents with the alert generator, including providing to the alert generator an identifier for each registered alert reporting agent and an identifier of a system management server to which each registered alert reporting agent communicates alerts;
designating, by the alert generator in dependence upon an adaptive primary agent designation policy, a primary alert reporting agent among registered alert reporting agents that communicate alerts to a same system management server, wherein the adaptive primary agent designation policy comprises a policy that identifies a primary alert reporting agent in dependence upon performance metrics;

communicating by the alert generator a computer operation failure alert to all registered agents; and communicating, by the primary alert reporting agent only, the alert to the system management server.

2. The method of claim 1 wherein:

at least one of the agents is an in-band alert reporting agent adapted upon the processor and the main memory of the computer, the in-band alert reporting agent communicating with the alert generator by operating system calls directly to and from the alert generator; and at least one of the agents is an out-of-band alert reporting agent adapted upon a service processor, the out-of-band alert reporting agent communicating with the alert generator via a system management network of the computer.

3. The method of claim 1 wherein communicating the alert to the system management server further comprises communicating the alert by a secondary alert reporting agent if the primary alert reporting agent fails to communicate the alert within a predetermined period of time.

4. The method of claim 1 wherein:

the method further comprises designating, by the alert generator, at least one secondary alert reporting agent among registered alert reporting agents that communicate alerts to a same system management server;

communicating, by the primary alert reporting agent only, the alert to the system management server further comprises reporting, by the primary alert reporting agent to the secondary alert reporting agent that the alert has been communicated to the system management server; and communicating the alert to the system management server further comprises communicating the alert by a secondary alert reporting agent if the primary alert reporting agent fails to report to the secondary alert reporting agent within a predetermined period of time that the alert has been communicated to the system management server.

5. The method of claim 1 wherein:

designating a primary alert reporting agent further comprises marking the primary alert reporting agent as such in registration data maintained by the alert generator; and communicating by the alert generator a computer operation failure alert to all registered agents, including communicating to all registered agents the identity of the primary alert reporting agent.

6. The method of claim 1 wherein designating a primary alert reporting agent further comprises communicating to all registered agents the identity of the primary alert reporting agent.

7. Apparatus for reporting and processing computer operation failure alerts, the apparatus comprising a computer processor and a computer memory operatively coupled to the computer processor, the computer memory having disposed within it computer program instructions capable, when executed, of causing the processor to carry out the steps of:

deploying on a computer in a computing environment a plurality of alert reporting agents, each alert reporting agent comprising a separate module of automated computing machinery configured to communicate an alert of present or pending failure, the computing environment comprising a plurality of computers including a system management server that monitors the operating conditions of the other computers in the computing environment, the computer further comprising an alert generator, the alert generator comprising an operating system-level module of automated computing machinery configured to accept registrations of alert reporting agents, to generate alerts of present or pending failure, and to provide the generated alerts to registered alert reporting agents;

registering the alert reporting agents with the alert generator, including providing to the alert generator an identifier for each registered alert reporting agent and an identifier of a system management server to which each registered alert reporting agent communicates alerts;

designating, by the alert generator in dependence upon an adaptive primary agent designation policy, a primary alert reporting agent among registered alert reporting agents that communicate alerts to a same system management server, wherein the adaptive primary agent designation policy comprises a policy that identifies a primary alert reporting agent in dependence upon performance metrics;

communicating by the alert generator a computer operation failure alert to all registered agents; and communicating, by the primary alert reporting agent only, the alert to the system management server.

8. The apparatus of claim 7 wherein:

at least one of the agents is an in-band alert reporting agent adapted upon the processor and the main memory of the computer, the in-band alert reporting agent communicating with the alert generator by operating system calls directly to and from the alert generator; and at least one of the agents is an out-of-band alert reporting agent adapted upon a service processor, the out-of-band alert reporting agent communicating with the alert generator via a system management network of the computer.

9. The apparatus of claim 7 wherein communicating the alert to the system management server further comprises communicating the alert by a secondary alert reporting agent if the primary alert reporting agent fails to communicate the alert within a predetermined period of time.

10. The apparatus of claim 7 wherein:

the apparatus further comprises computer program instructions capable of causing the processor to carry out the step of designating, by the alert generator, at least one secondary alert reporting agent among registered alert reporting agents that communicate alerts to a same system management server;

communicating, by the primary alert reporting agent only, the alert to the system management server further comprises reporting, by the primary alert reporting agent to the secondary alert reporting agent that the alert has been communicated to the system management server; and communicating the alert to the system management server further comprises communicating the alert by a secondary alert reporting agent if the primary alert reporting agent fails to report to the secondary alert reporting agent within a predetermined period of time that the alert has been communicated to the system management server.

11. The apparatus of claim 7 wherein:

designating a primary alert reporting agent further comprises marking the primary alert reporting agent as such in registration data maintained by the alert generator; and communicating by the alert generator a computer operation failure alert to all registered agents, including communicating to all registered agents the identity of the primary alert reporting agent.

12. The apparatus of claim 7 wherein designating a primary alert reporting agent further comprises communicating to all registered agents the identity of the primary alert reporting agent.

13. A computer program product for reporting and processing computer operation failure alerts, the computer program product disposed upon a computer-readable recording medium, the computer program product comprising computer program instructions capable, when executed, of causing automated computing machinery to carry out the steps of:
deploying on a computer in a computing environment a plurality of alert reporting agents, each alert reporting agent comprising a separate module of automated computing machinery configured to communicate an alert of present or pending failure, the computing environment comprising a plurality of computers including a system management server that monitors the operating conditions of the other computers in the computing environment, the computer further comprising an alert generator, the alert generator comprising an operating system-level module of automated computing machinery configured to accept registrations of alert reporting agents, to generate alerts of present or pending failure, and to provide the generated alerts to registered alert reporting agents;
registering the alert reporting agents with the alert generator, including providing to the alert generator an identifier for each registered alert reporting agent and an identifier of a system management server to which each registered alert reporting agent communicates alerts;
designating, by the alert generator in dependence upon an adaptive primary agent designation policy, a primary alert reporting agent among registered alert reporting agents that communicate alerts to a same system management server, wherein the adaptive primary agent designation policy comprises a policy that identifies a primary alert reporting agent in dependence upon performance metrics;
communicating by the alert generator a computer operation failure alert to all registered agents; and
communicating, by the primary alert reporting agent only, the alert to the system management server.

14. The computer program product of claim 13 wherein:
at least one of the agents is an in-band alert reporting agent adapted upon the processor and the main memory of the computer, the in-band alert reporting agent communicating with the alert generator by operating system calls directly to and from the alert generator; and
at least one of the agents is an out-of-band alert reporting agent adapted upon a service processor, the out-of-band alert reporting agent communicating with the alert generator via a system management network of the computer.

15. The computer program product of claim 13 wherein communicating the alert to the system management server further comprises communicating the alert by a secondary alert reporting agent if the primary alert reporting agent fails to communicate the alert within a predetermined period of time.

16. The computer program product of claim 13 wherein:
the computer program product further comprises computer program instructions capable of causing the automated computing machinery to carry out the step of designating, by the alert generator, at least one secondary alert reporting agent among registered alert reporting agents that communicate alerts to a same system management server;
communicating, by the primary alert reporting agent only, the alert to the system management server further comprises reporting, by the primary alert reporting agent to the secondary alert reporting agent that the alert has been communicated to the system management server; and
communicating the alert to the system management server further comprises communicating the alert by a secondary alert reporting agent if the primary alert reporting agent fails to report to the secondary alert reporting agent within a predetermined period of time that the alert has been communicated to the system management server.

17. The computer program product of claim 13 wherein designating a primary alert reporting agent further comprises communicating to all registered agents the identity of the primary alert reporting agent.

* * * * *